United States Patent [19]

Thye et al.

[11] 4,270,019

[45] May 26, 1981

[54] CONNECTING PIECE BETWEEN CABLES AND BUS BARS

[75] Inventors: Jürgen Thye; Karl Höffner, both of Erlangen, Fed. Rep. of Germany

[73] Assignee: Siemens Aktiengesellschaft, Berlin & Munich, Fed. Rep. of Germany

[21] Appl. No.: 40,463

[22] Filed: May 18, 1979

[30] Foreign Application Priority Data

Jun. 7, 1978 [DE] Fed. Rep. of Germany ....... 2825037

[51] Int. Cl.[3] ........................ H02B 1/20; H01R 11/00

[52] U.S. Cl. .................................. 174/32; 174/72 R; 174/88 S; 307/89; 339/242

[58] Field of Search ..................... 174/32, 70 B, 71 B, 174/72 R, 72 B, 88 R, 88 S, 88 B; 307/89; 339/242; 361/341, 355, 361

[56] References Cited

U.S. PATENT DOCUMENTS

| | | | |
|---|---|---|---|
| 3,609,208 | 9/1971 | Winpisinger | 174/32 |
| 3,995,103 | 11/1976 | Gehrs et al. | 174/72 B |

*Primary Examiner*—Laramie E. Askin
*Attorney, Agent, or Firm*—Kenyon & Kenyon

[57] ABSTRACT

To connect two bus bars to two sets of cables which are bunched to produce a low stray field, a connecting piece is provided, in which parallel, electrically conducting, plates are provided with angled-off connecting straps and connecting lugs, the connecting straps being connected to the bus bars and the connecting lugs being connected to the cable ends by means of cable terminals.

3 Claims, 4 Drawing Figures

CONNECTING PIECE BETWEEN CABLES AND BUS BARS

BACKGROUND OF THE INVENTION

1. Field of the Invention

This invention relates to a connecting piece for use between bus bars of different polarity and a fairly large number of cables bunched together to produce a low stray field. More particularly, it relates to an arrangement in which at least two electrically conducting plates, which are connected to a bus bar, are arranged, in insulated relationship, in parallel planes which are perpendicular to the cables.

2. Discussion of the Prior Art

In installations in which electric cables must be arranged so that an emanated stray magnetic field or electromagnetic interference with nearby parts of the installation or with the internal inductance of cable installations must be kept low, the cables are bunched to minimize the stray field. The associated switching equipment is equipped, in many cases, with conventional switchgear. Thus, in DC installations for large currents, two-pole circuit breakers are provided. Accordingly, and especially in cramped quarters, two DC bus bars are used for the internal connections, to which a large number of DC cables is connected via separate connecting pieces.

In one already proposed design, two electrically conducting plates, arranged in parallel planes perpendicular to the cables and insulated from each other, are provided as the connecting piece. Each plate is bolted to a DC bus bar supported thereon by its flat side. The cable ends are provided with conical press fits and threaded bolts which are inserted into holes in the plates and the ends of the DC bus bars and are bolted tight. Because of the poor accessibility, a definite order must be observed in attaching the cable ends. To detach a cable, it is usually necessary to detach several other cable connections. In addition, attaching the threaded bolts at the cable ends to the plates is very cumbersome.

It is an object of the invention to describe a connecting piece having a low stray field between bus bars and cables, which allows simpler fastening of the cables than in the arrangements having low stray fields known in the past, and which is easier to manufacture.

SUMMARY OF THE INVENTION

According to the present invention, this problem is solved by attaching at least one connecting strap pointing in the direction of the bus bars to each plate, arranging for one of the connecting straps to protrude through a cutout in the other plate, and attaching and connecting lugs pointing in the direction of the cable ends at the plates in such a way that they are interleaved to produce a low stray field and can be connected to the cable ends via cable terminals.

In this way, it is possible to connect the cables and bus bars by means of standard, commercially available parts, such as cable terminals, screws and nuts, and no predetermined order need be observed in the installation of the cables. As compared to the already known connection to two connecting bars in which the cables must be threaded through holes in the base plate and bus bars, easier handling is achieved and manufacturing costs are considerably lowered because the fitting work is eliminated.

DETAILED DESCRIPTION OF THE INVENTION

Figure 1:
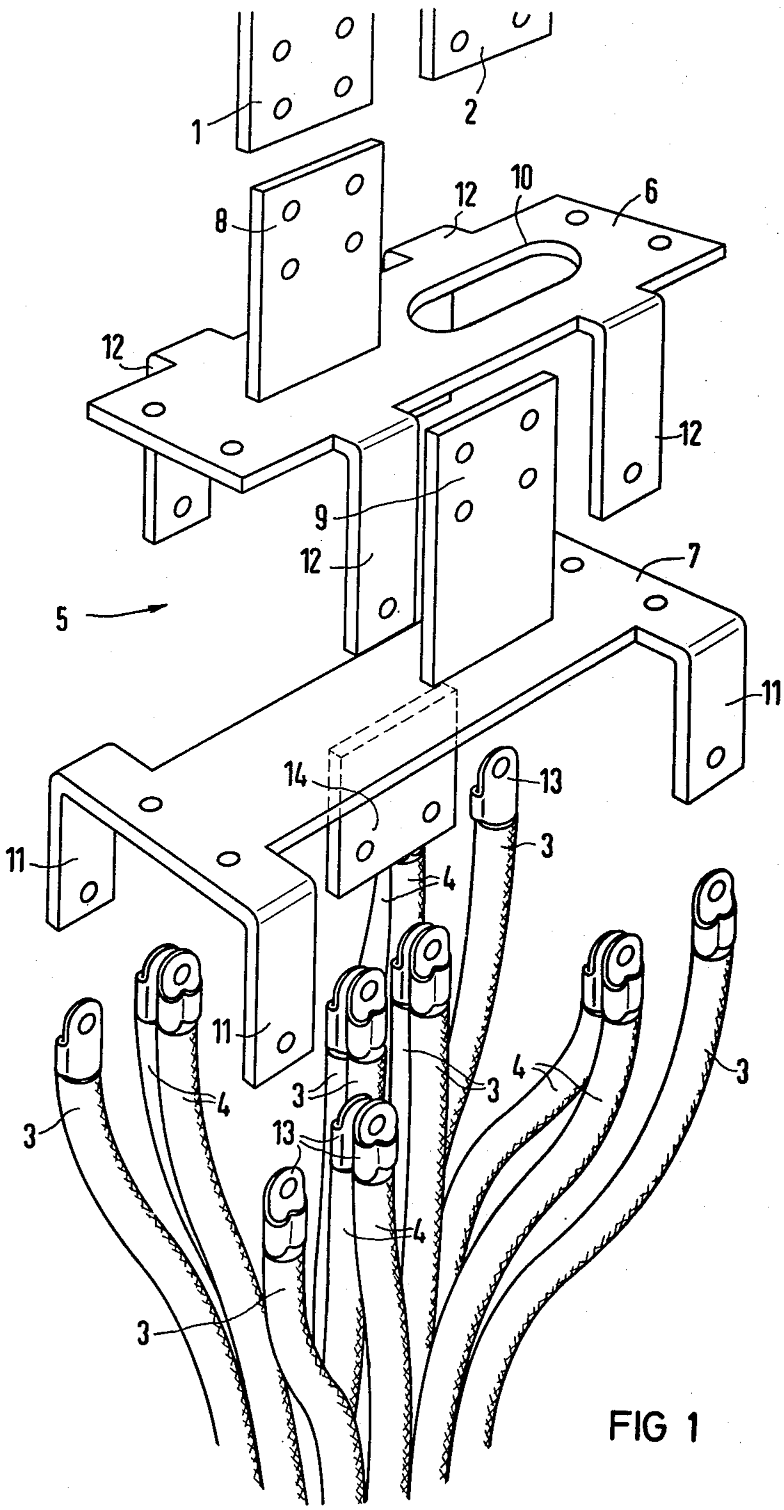
FIG. 1 is an exploded view of a connecting piece in which the electrically conducting plates have been taken apart for better understanding.
Figure 2:
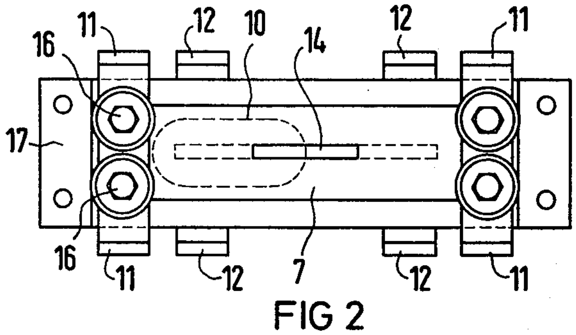
FIG. 2 is a top view of an assembled connecting piece.
Figure 4:
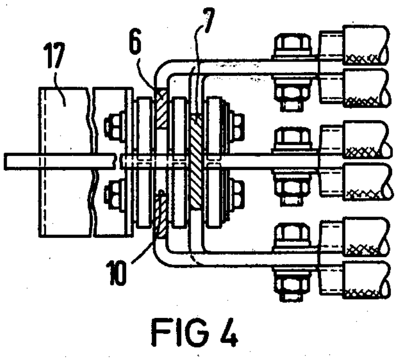
FIG. 4 is a front view of the connecting piece of FIG. 2.

As shown in FIG. 1, a connecting piece 5 containing two electrically conducting plates 6 and 7 which lie, insulated from one another, in parallel planes perpendicular to bus bars 1 and 2 and cables 3 and 4, serves for electrically connecting two bus bars 1 and 2, having different polarities, to a multiplicity of cables 3 of one polarity and a multiplicity of cables 4 of the other polarity. To each plate 6 and 7 connecting straps 8 and 9, respectively, projecting in the direction of bus bars 1 and 2, are attached. When connecting piece 5 is in assembled condition, connecting strap 9 of lower plate 7 protrudes through a cutout 10 in upper plate 6 (see also FIGS. 2, 3 and 4). Connecting lugs 11 and 12, for accepting cable terminals 13, are bent over in the direction of the ends of the cables 3 and 4 from the opposing long sides of plates 6 and 7 in such a way that, in the assembled condition of the plates, the connecting lugs are interleaved to minimize and provide a low stray field. A connecting lug 14 for cable terminals is also centrally attached to plate 7, near the ends of cables 3 and 4. The two plates 6 and 7 are held together at a predetermined distance from each other by means of screw bolts and nuts 16 and insulating tubes and insulating washers 15. In addition, screw bolts 16 carry brackets 17 for mounting the connecting piece.

Figure 3:
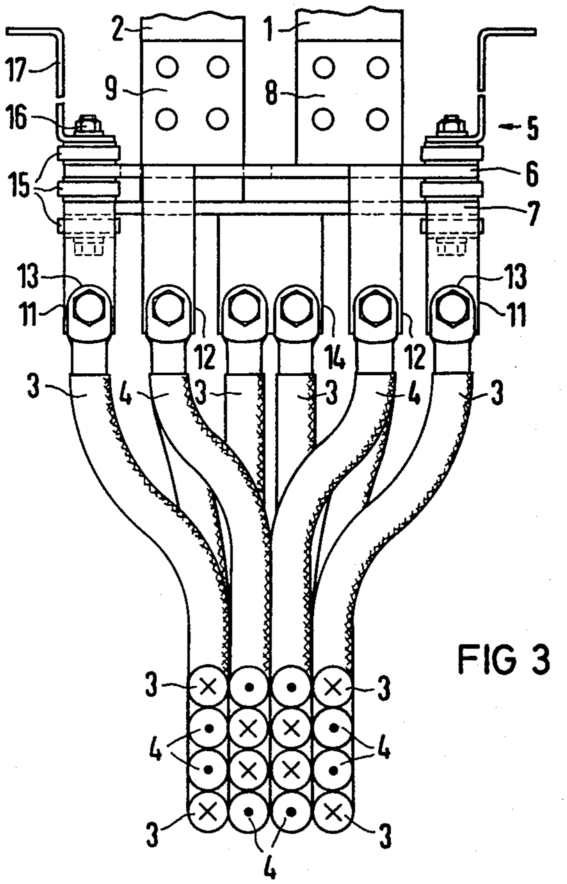
FIG. 3 is a side view of the connecting piece of FIG. 2.

In the illustrative connection shown in the drawings, two bus bars 1 and 2 of different polarity are connected to two-times-eight cables 3 and 4. the cables are bunched and carry currents in the directions indicated on the wire ends in FIG. 3 by means of dots and crosses. Plate 7 has depending connecting lugs 11 at each of its four corners and a depending connecting lug 14 in its center; the other plate 6 has only four depending connecting lugs 12 which are offset inward to clear lugs 11. To make a connection having a low stray field, a cable 3, having the current direction as indicated by a cross, is connected, by means of a cable terminal 13, to each of the connecting lugs 11 arranged at the four corners of plate 7. Four cables 3, having the same current direction as indicated by a cross, are also connected to central connecting lug 14. Two cables 4, each having the current direction designated by a dot, are connected by their own cable terminals 13 to the four connecting lugs 12 of the other conductor plate 6. The transition from bunched cable to bus bars takes place in a small distance, leaving little space which is not magnetically compensated. The arrangement shown has the advantage that the polarity of bus bars 1 and 2 does not have to be changed when the direction of current flow in cables 3 and 4 is reversed by a 180° rotation on the axis of connecting piece 5, because then connecting strap 9 is connected to bus bar 1 and connecting strap 8, to bus bar 2.

What is claimed is:

1. In a connector for connecting bus bars of different polarities with the ends of a fairly large number of cables, bunched to produce a low stray field, comprising at least two electrically conducting plates, each adapted for connection to a bus bar, and disposed, insulated from each other, in parallel planes, the improvement comprising, in a connector for use in the end-to-end connection of bus bars and cables:

at least one connecting strap attached to each plate pointing towards the direction of approach of the bus bars and adapted for connection to a bus bar, one of the connecting straps protruding through a cutout in the other plate; and connecting lugs, pointing towards the direction of approach of the cable ends and adapted for connection to cable terminals on the cable ends, the connecting lugs attached to the plates and interleaved in such a way that the cables, when attached, produce a low stray field.

2. In a connector in accordance with claim 1, the further improvement comprising:

the connecting lugs bent over from the plates, and at least one central connecting lug connected by welding or soldering to the plate surface nearest to and facing the approach of the cable ends.

3. In a connection in accordance with claim 2 for connecting two-times-eight cables to two bus bars, the further improvement comprising:

a connecting lug located at each of the four corners of one plate and adapted for connection to a cable of one polarity;

the central connecting lug adapted for connection to four cables of the same polarity; and four connecting lugs on the other plate which are offset inward from the lugs of the first plate and adapted for connection to two cables of the other polarity.

* * * * *